UNITED STATES PATENT OFFICE.

GEORGE BRYANT, OF FINSBURY PARK, LONDON, AND CHARLES HORACE IVINSON, OF ILFORD, ENGLAND; SAID BRYANT ASSIGNOR TO SAID IVINSON.

PROCESS FOR THE TREATMENT OF METALS AND ALLOYS.

1,002,133.  Specification of Letters Patent.  Patented Aug. 29, 1911.

No Drawing.  Application filed August 9, 1909.  Serial No. 512,000.

*To all whom it may concern:*

Be it known that we, GEORGE BRYANT, of 15 Blackstock road, Finsbury Park, in the county of London, England, and CHARLES HORACE IVINSON, of "Wyngarth," Oakfield Road, Ilford, in the county of Essex, England, subjects of the King of England, have invented a new and useful Process for the Treatment of Metals and Alloys, of which the following is a specification.

This invention relates to a process for the treatment of metals and alloys, including solders, which melt at a comparatively low temperature, with chemical reagents that will purify the same to some degree by cleaning them with fluxes to remove undesirable substances, such as silica, oxids of extraneous metals, etc. Such metals, moreover, mix and alloy readily with one another when in a molten state. In the case of the solder oxidation is prevented so that perfect union of the solder with the metal or alloy to be joined is secured.

The process consists essentially in bringing the metals or alloys, while in a molten state and in a fine state of sub-division, into contact with a flux or successively into contact with solvents containing the chemical reagents in a state of solution. After treatment the particles are removed and may be remelted for use.

A preferred method consists in passing the molten metal through a sieve and allowing the minute drops to fall into the cleaning solution, or layers of solutions containing the chemical reagents which have a fluxing action that tend to remove impurities from the surfaces of the drops. The sieve or the like should be placed very near the surface of the liquid into which the minute drops are to fall, so that the metals may be perfectly molten when reaching the liquid.

As suitable fluxes various metallic salts may be used, such as chlorids, cyanids, chromates, ferro-cyanids, vanadates, molybdates; or instead suitable acids and alkalis may be employed. Also sulfur, phosphorus, iodin, and similar elements dissolved in oil, fats, waxes, petroleum, turpentine, alcohol and water may be used as fluxes.

The following is an example of the treatment of one metal by the foregoing process:—Zinc is melted and then passed through a sieve to finely divide the same, and these particles are then passed through two solutions, viz:—an oil solution of phosphorus, and a water solution of zinc chlorid or ammonium chlorid, the oil solution floating upon the surface of the water solution. The resulting granulated metal alloys practically instantaneously with molten copper producing brass alloys of regular composition, free from oxid and extremely tough. In the case of solder the substance is melted and treated in like manner.

It would appear that the action which takes place is complex. Generally the reagent in the oil solution combines with the oxids on the metal or alloy treated and the product formed is removed by being dissolved in the water solution, the presence of dissolved fluxes in this solution facilitating the solution.

It will be understood that the chemical substances are chosen according to the nature of the metal and the impurities to be removed. Where two solutions are used we prefer to simplify the process to have the solutions in layers in the same vessel, for instance we may have a solution of chemical substances in oil, which latter solution is floated on top of the former so that the drops of molten metal pass through the fluxes in a particular order, as in the case of the example given above. In practice it is found convenient in the example given to float the solution of phosphorus in oil upon the solution of zinc chlorid and water, as this saves the necesisty of melting the metal a second time.

What is claimed is:—

1. The process of treating metals which consists in melting said metals, and passing the same successively through a plurality of layers of different solutions containing suitable fluxes for the purpose of cleaning the same.

2. The process of treating metals and rendering them more easy to alloy with other metals which consists in melting said first mentioned metals; in finely dividing the same; and in causing the finely divided molten metals to be subjected to solutions containing reagents capable of chemically cleaning the surfaces of the metals.

3. The process of treating a metal and rendering the same more easy to alloy, which consists in finely dividing said metal while in a molten condition; and in immediately passing the same through successive layers of oil and water containing a chemical capable of cleaning the surfaces of the metal particles.

4. The process of treating a metal and rendering the same more easy to alloy, which consists in finely dividing said metal while in a molten condition; and in immediately passing the same through successive layers of oil containing a reagent capable of changing the oxid coated globules of the metal, and of water containing a chemical capable of exerting a cleaning action upon said metal, substantially as described.

5. The process of treating metals to be used as solders which consists in melting such metals, finely dividing the same, and bringing the finely divided particles into intimate contact with a chemical agent in oil solution substantially as described.

6. The process of treating metals to be used as solders which consists in bringing such metals while in a molten and finely divided state into intimate contact with an oil solution and a water solution of a chemical compound, said oil solution containing a solute different from the solute in the water solution, substantially as described.

In testimony whereof, we affix our signatures, in presence of two witnesses.

GEORGE BRYANT.
CHARLES HORACE IVINSON.

Witnesses:
  A. E. VIDAL,
  L. SIMMONDS.